No. 768,737. PATENTED AUG. 30, 1904.
F. A. DIXON.
CAN CAPPING MACHINE.
APPLICATION FILED NOV. 27, 1903.
NO MODEL. 2 SHEETS—SHEET 1.

Witnesses.
H. Monteverde.
Walter F. Crane.

Inventor.
Frank A. Dixon
by Wm. F. Booth
his Attorney

No. 768,737. PATENTED AUG. 30, 1904.
F. A. DIXON.
CAN CAPPING MACHINE.
APPLICATION FILED NOV. 27, 1903.
NO MODEL. 2 SHEETS—SHEET 2.
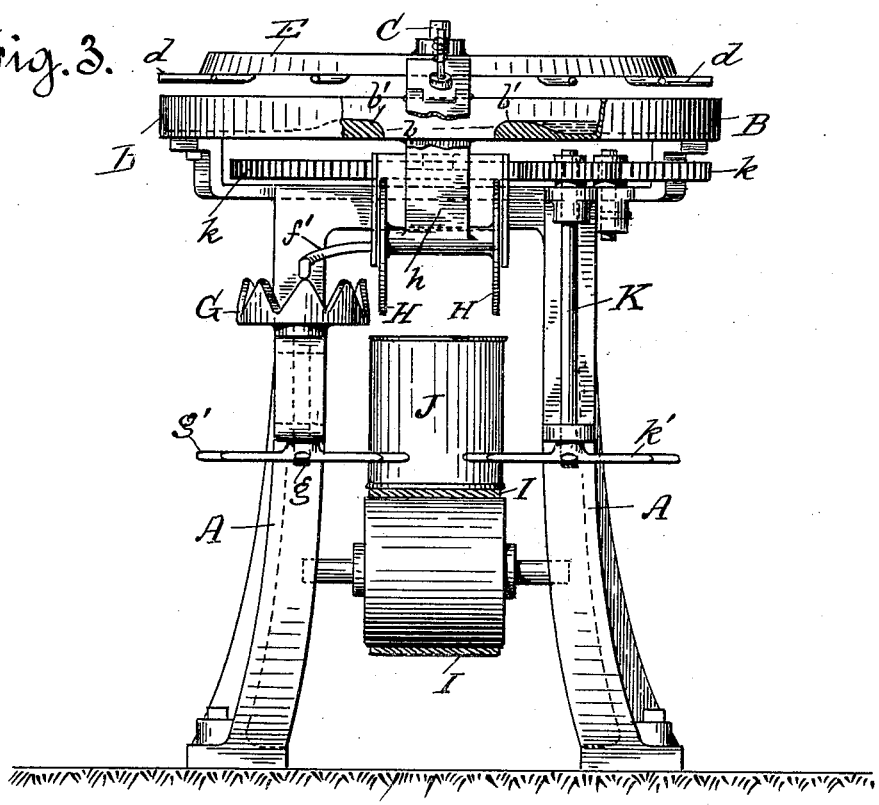
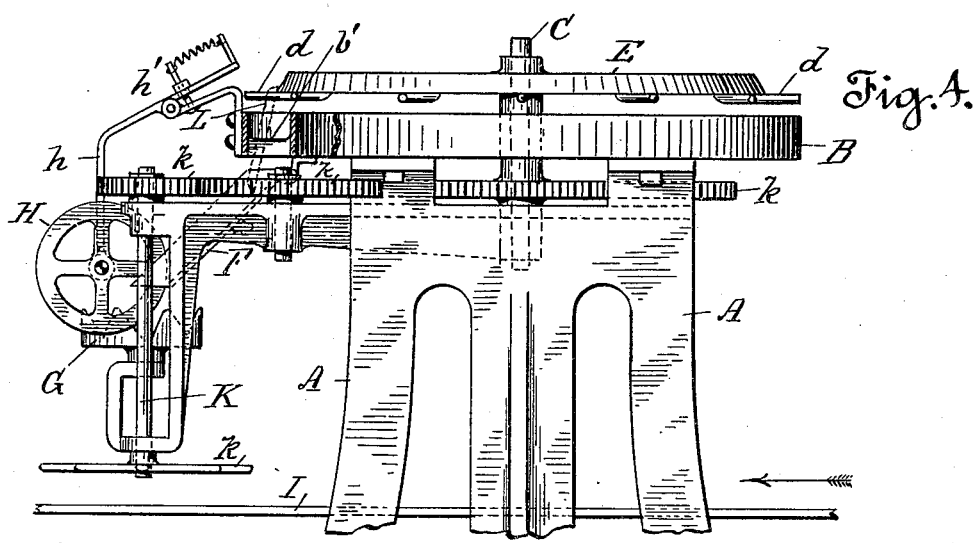
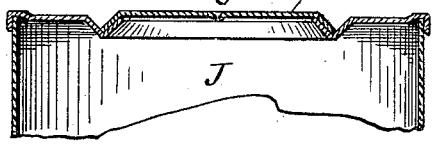
Witnesses. Inventor.
Frank A. Dixon
by Wm F. Booth
his Attorney No. 768,737. Patented August 30, 1904.

UNITED STATES PATENT OFFICE.

FRANK A. DIXON, OF SAN JOSE, CALIFORNIA.

CAN-CAPPING MACHINE.

SPECIFICATION forming part of Letters Patent No. 768,737, dated August 30, 1904.

Application filed November 27, 1903. Serial No. 182,807. (No model.)

*To all whom it may concern:*

Be it known that I, FRANK A. DIXON, a citizen of the United States, residing at San Jose, Santa Clara county, State of California, have invented certain new and useful Improvements in Can-Capping Machines; and I do hereby declare the following to be a full, clear, and exact description of the same.

My invention relates to can-capping machinery, and particularly to a machine for first applying the acid or flux to the caps and then delivering said caps to the can-heads.

The usual method of capping a can is to first place the cap on the apertured can-head, then to apply the flux to the exposed surfaces of cap-flange and head-groove, and finally to apply the solder. By this method there is a waste of solder and a doubtful seal, for the reason that the surfaces which are the best to unite in order to form a perfect seal with the use of the least solder—namely, the inner surface of the cap-flange and the inner wall of the head-groove—are covered up by the seating of the cap in place and no solder reaches them, for they are not supplied with flux; but if the inner surface of the cap-flange before it is seated be wet with the flux then a small amount of solder applied in the base of the groove will "sweat" or creep up between the said inner surface of the cap-flange and the inner wall of the head-groove, thereby soldering surfaces best adapted for a tight seal and with the use of a minimum amount of solder, in contradistinction to the usual method of using a large quantity of solder to fill up a deep groove with but doubtful success. From this it will readily be seen that the essential object of my machine is to supply the cap-flange with the flux prior to seating it upon the can-head preparatory to the soldering operation.

To this end my invention consists, essentially, in means for applying the flux to the cap, means for thereafter delivering it to the can, and means for seating said cap on the can-head.

It also consists in the novel construction, arrangement, and combination of parts, which I shall now describe by reference to the accompanying drawings, in which—

Figure 1:
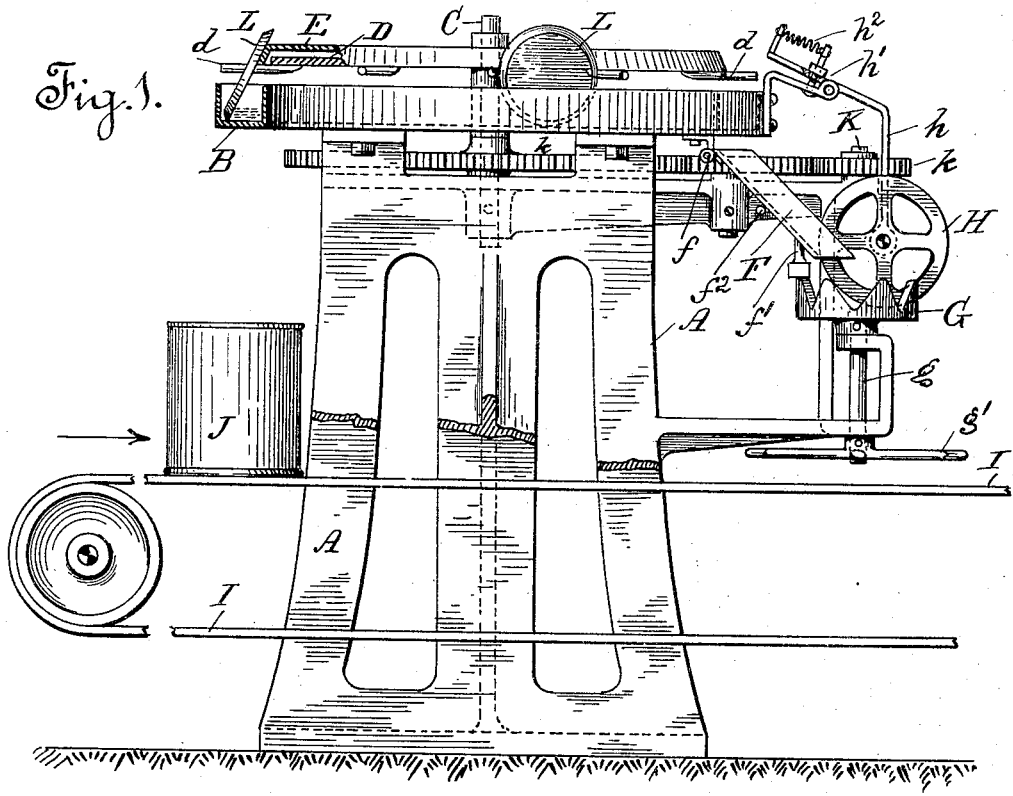
Figure 2:
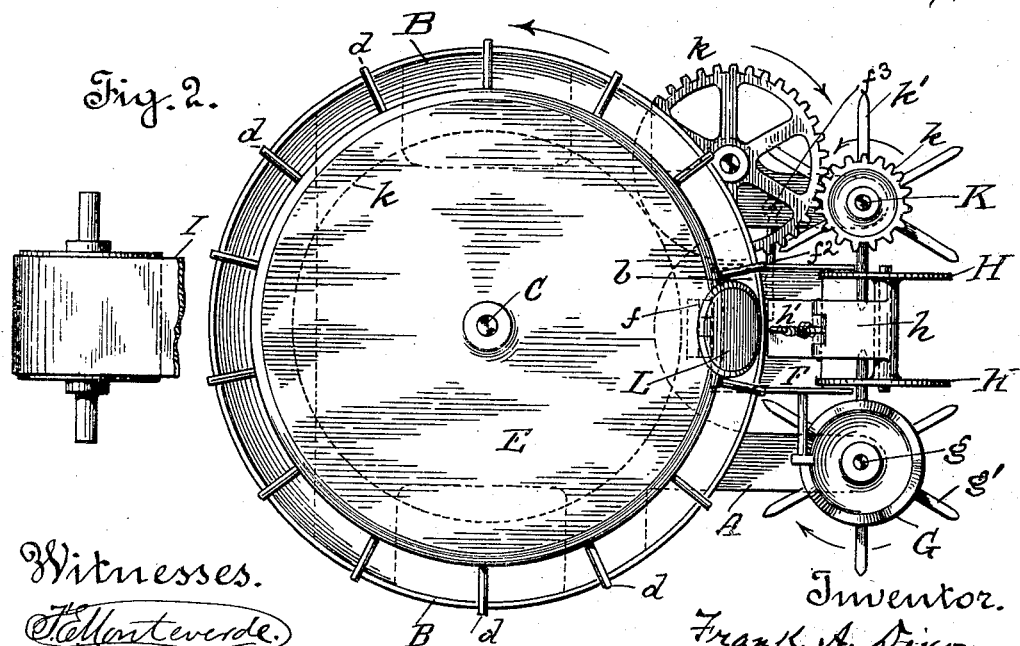

Figure 1 is a side elevation, partly broken, of my machine. Fig. 2 is a top plan of the same. Fig. 3 is a front view, partly broken. Fig. 4 is a side elevation, partly broken, taken from the side opposite to that of Fig. 1. Fig. 5 is a sectional detail of a can, showing the application of a cap thereto.

A is the frame of the machine. Upon this frame is supported an annular trough B, which is to contain the acid or flux bath.

C is a rotatable shaft carrying the feeder D, the radial arms $d$ of which extend over the acid-bath trough B.

E is a guide-disk secured upon shaft C above the feeder D and adapted to furnish support for the caps to lean against while moving through the acid-bath. In the acid-bath trough B is a discharge-opening $b$, directly below which is a chute F, hinged at its upper end at $f$ to the trough B and supported at its lower end by an arm $f'$, the free end of which rests upon a cam G. This cam consists of an annular series of alternating elevations and depressions, as shown, and is mounted upon a shaft $g$, to which an intermittent rotation is imparted by means presently to be described. The effect of the cam is to raise and drop the chute alternately. An arm $f^2$ under the chute serves as a stop to limit its downward movement.

H represents wheels or rollers serving, primarily, as checks for the caps in the chute and serving also as guides to direct the cap and press it down into a recumbent position on the can-head. These check pressure-rollers are carried by an arm $h'$ hinged at $h$ to a fixed bracket, said arm having a projection beyond its hinge, the extremity of said projection being connected by a spring $h^2$ to a fixed pin rising from the bracket, Figs. 1 and 4, the tension of said spring being to normally hold the rollers down to proper position relatively to the chute, but adapting said rollers to yield upwardly to pressure due to any foreign or enlarged matter upon the cap, which except for such relief would act as an obstruction to the passage of the cap out of the chute.

I is a traveling carrier upon which the cans J are placed. These cans are headed; but the cap-opening is uncovered.

K is a shaft which through a chain of gears (represented by $k$) is adapted to transmit motion to the feeder-shaft C. Upon the lower end of shaft K is a star-wheel $k'$, with which the passing cams come in contact in order to intermittently turn said wheel and through the power-transmitting devices to turn the feeder D. Similarly upon the lower end of cam-shaft $g$ is a star-wheel $g'$, operated by the contact of the passing cans to operate the cam G.

The relative arrangements and times of operation of the several parts will be fully obvious from a description of the operation of the machine, which I shall now give. It must first be observed that the acid-trough on each side of the discharge-opening has inclined planes $b'$, which confine the liquid, but permit the caps to roll up to the opening. The caps L are placed in the acid-trough, resting upon their edges and slightly inclined inwardly against the support E. Each cap lies between a pair of feeder-arms $d$. In this position the cap-flanges are immersed in the flux or acid in trough B. Assuming the machine to be in full operation, a can J contacting with the star-wheel $k'$ transmits motion to the feeder D, and a cap L nearest the discharge is thereby rolled by the arms $d$ to the discharge-opening $b$. Through this it falls into the chute F and descends by gravity in an inclined position until arrested by the check-rollers H. The can J having also come in contact with the star-wheel $g'$ causes a movement of cam G. The arm $f'$ of chute F, which had been resting on an elevation of the cam, thereby holding the chute up to its position relatively to the check-rollers, now by the continued contact of the can with said star-wheel $g'$ descends into a depression of the cam, thereby allowing the chute to drop down to its limiting-arm $f^2$. This drop of the chute removes it sufficiently from the check-rollers to permit the cap to pass under the latter down to the can, upon the grooved head of which the lower edge of said cap now rests. The forward movement of the can now carries the cap with it, and said cap passing under the rollers is by them pressed down into a recumbent position upon its seat upon the can-head. The can thus capped proceeds to the soldering-tool, (not here shown,) by which the soldering is effected, the seal being made by the solder "sweating" up the covered inside surfaces, due to the previous application of the flux to the can-flange. After the cap has left the chute the cam G lifts the chute again to its normal position, ready, in conjunction with the rollers, to receive and check a second cap. The can next following now comes in contact with the star-wheel $k'$, which by its movement operates feeder D to roll a second cap (which by the previous movement of the feeder has been advanced) to the discharge-opening. This cap falls into chute F and passes down to the check-rollers. Thereupon the can by contact with the star-wheel $g'$ causes the chute to drop, which permits the cap to pass down to the can-head, upon which it is pressed down to a recumbent position by the rollers. A third can effects the delivery of a third cap, and so on. The limiting-arm $f^2$ of the chute by being made adjustable in a horizontal plane, as by swinging about a pivot $f^3$, can be made to vary the downward limit of the chute, thereby providing for different thicknesses of caps. Thus it will be seen that the periodic movement of the feeder D rolls successive caps through the acid-bath to the discharge-opening $b$, thereby effecting the prime object of the machine—namely, the application of the flux to the flange of the cap—prior to seating it upon the can-head.

Having thus described my invention, what I claim as new, and desire to secure by Letters Patent, is—

1. In a can-capping machine, the combination of means for applying the flux to the caps, means for thereafter directing said caps to the cans, and means for seating them on the can-heads.

2. In a can-capping machine, the combination of a trough to contain the fluxing-bath, traveling separated arms projecting over the trough and adapted to roll the caps on edge through the bath to a discharge, and a means for receiving the caps from the trough and delivering them to the cans.

3. In a can-capping machine, the combination of a trough to contain the fluxing-bath, means for supporting the caps on edge in said trough, traveling separated arms projecting above the trough and adapted to roll the caps therethrough and to a discharge, and a means for receiving the caps from the trough and delivering them to the cans.

4. In a can-capping machine, the combination of an annular trough containing the fluxing-bath, said trough having a discharge-opening for the caps, a rotatable feeder having arms projecting over the trough and adapted to roll the caps therethrough and to the discharge-opening, and a chute below said opening to receive the caps, and deliver them to the cans.

5. In a can-capping machine, the combination of an annular trough containing the fluxing-bath, said trough having a discharge-opening for the caps, a disk for supporting the caps on edge in the trough, a rotatable feeder having arms projecting over the trough and adapted to roll the caps therethrough and to the discharge-opening, and a chute below said opening to receive the caps, and deliver them to the cans.

6. In a can-capping machine, the combination of an annular trough containing the fluxing-bath, said trough having a discharge-opening for the caps, a rotatable feeder having arms projecting over the trough and adapted to roll the caps therethrough and to the discharge-opening, a traveling conveyer for the cans, means operated by contact with the traveling cans, for rotating the feeder, and a chute under the discharge-opening of the trough to receive the caps therefrom, and deliver them to the passing cans.

7. In a can-capping machine, the combination of an annular trough containing the fluxing-bath, said trough having a discharge-opening for the caps, a rotatable feeder having arms projecting over the trough and adapted to roll the caps therethrough and to the discharge-opening, a chute under the discharge-opening to receive the caps therefrom, a traveling conveyer for the cans, means for controlling the delivery of the caps from the chute to the cans, and means operated by the contact therewith of the traveling cans, for actuating said delivery-controlling means.

8. In a can-capping machine, the combination of an annular trough containing the fluxing-bath, said trough having a discharge-opening for the caps, a rotatable feeder having arms projecting over the trough and adapted to roll the caps therethrough and to the discharge-opening, a traveling conveyer for the cans, means operated by contact with the traveling cans for rotating the feeder, a chute under the discharge-opening of the trough to receive the caps therefrom, and to deliver them to the passing cans, controlling devices for regulating the delivery of said caps, and means operated by contact with the passing cans for actuating said controlling devices.

9. In a can-capping machine, the combination of an annular trough containing the fluxing-bath, said trough having discharge-openings for the caps, a rotatable feeder having arms projecting over the trough and adapted to roll the caps therethrough and to the discharge-opening, an adjustable chute under said discharge-opening to receive the caps, check-rollers operating in connection with said chute to control the delivery of the caps, a traveling conveyer for the cans, and means operated by contact with the passing cans for adjusting the chute relatively to the check-rolls to deliver the caps to the cans.

10. In a can-capping machine, the combination of the adjustable delivery-chute for the caps, with the yielding check-rollers operating in connection with the chute to control the delivery of the caps to the cans and to guide said caps to their seats on the cans.

11. In a can-capping machine, the combination of the flux-containing trough having a discharge-opening for the caps, a rotating feeder with arms adapted to roll the caps on edge through the trough to the discharge-opening, a hinged chute under said discharge-opening to receive the caps, yielding check-rollers operating in connection with the chute to control the delivery of the caps, a traveling conveyer for the cans, a contact-wheel in the path of the cans and adapted to be rotated by said cans, power-transmitting connections from said wheel to the feeder to rotate it, a second contact-wheel to be operated by the passing cans, and intervening devices to raise and lower the chute relatively to the check-rollers.

In witness whereof I have hereunto set my hand.

FRANK A. DIXON.

Witnesses:
BEATRICE M. LOCKTON,
DAVID LOCKTON.